E. HEDENSKOOG.
AUTOMATIC PIN SETTING MACHINE.
APPLICATION FILED FEB. 28, 1916.
1,190,650.
Patented July 11, 1916.
13 SHEETS—SHEET 2.
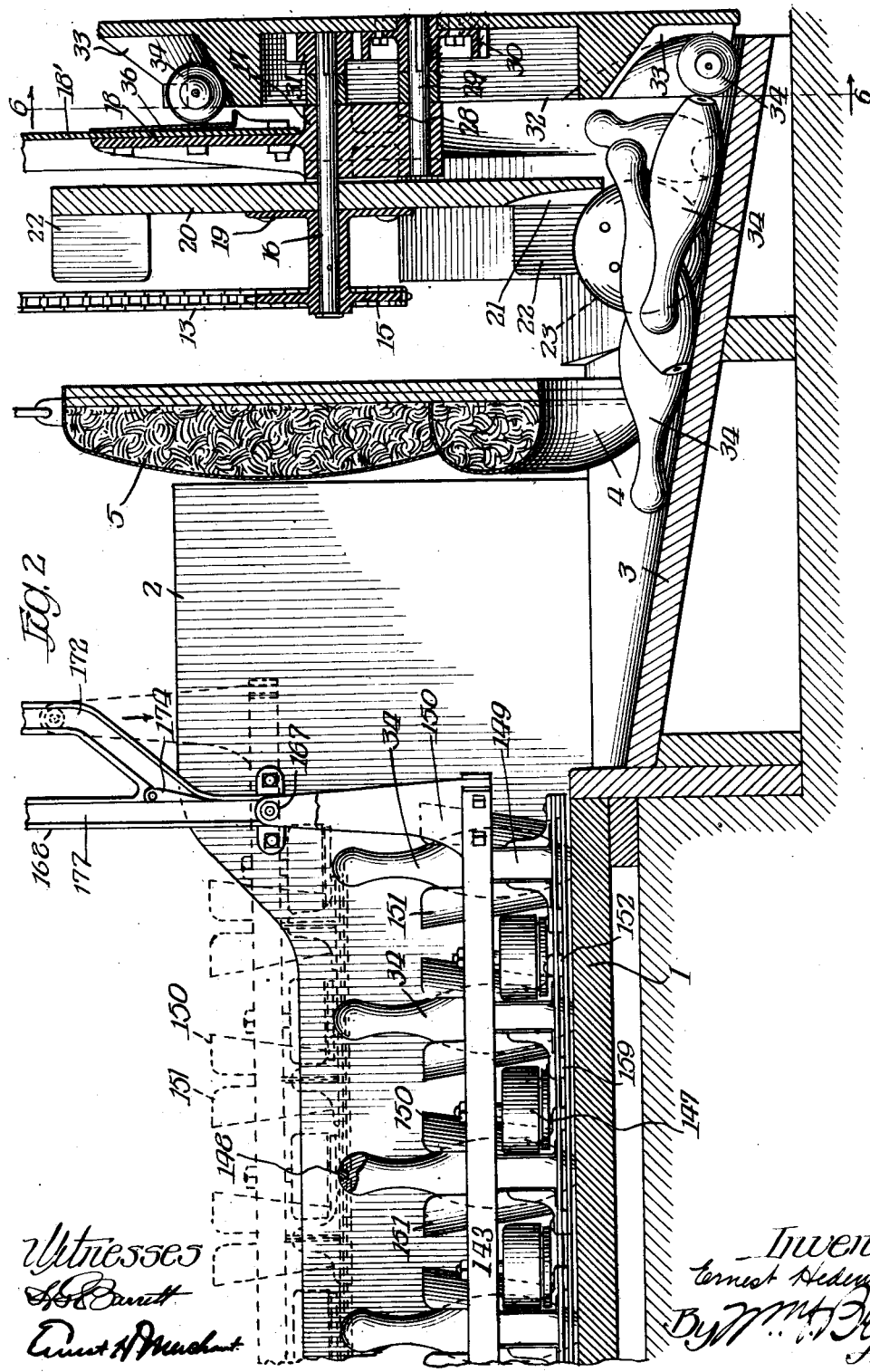

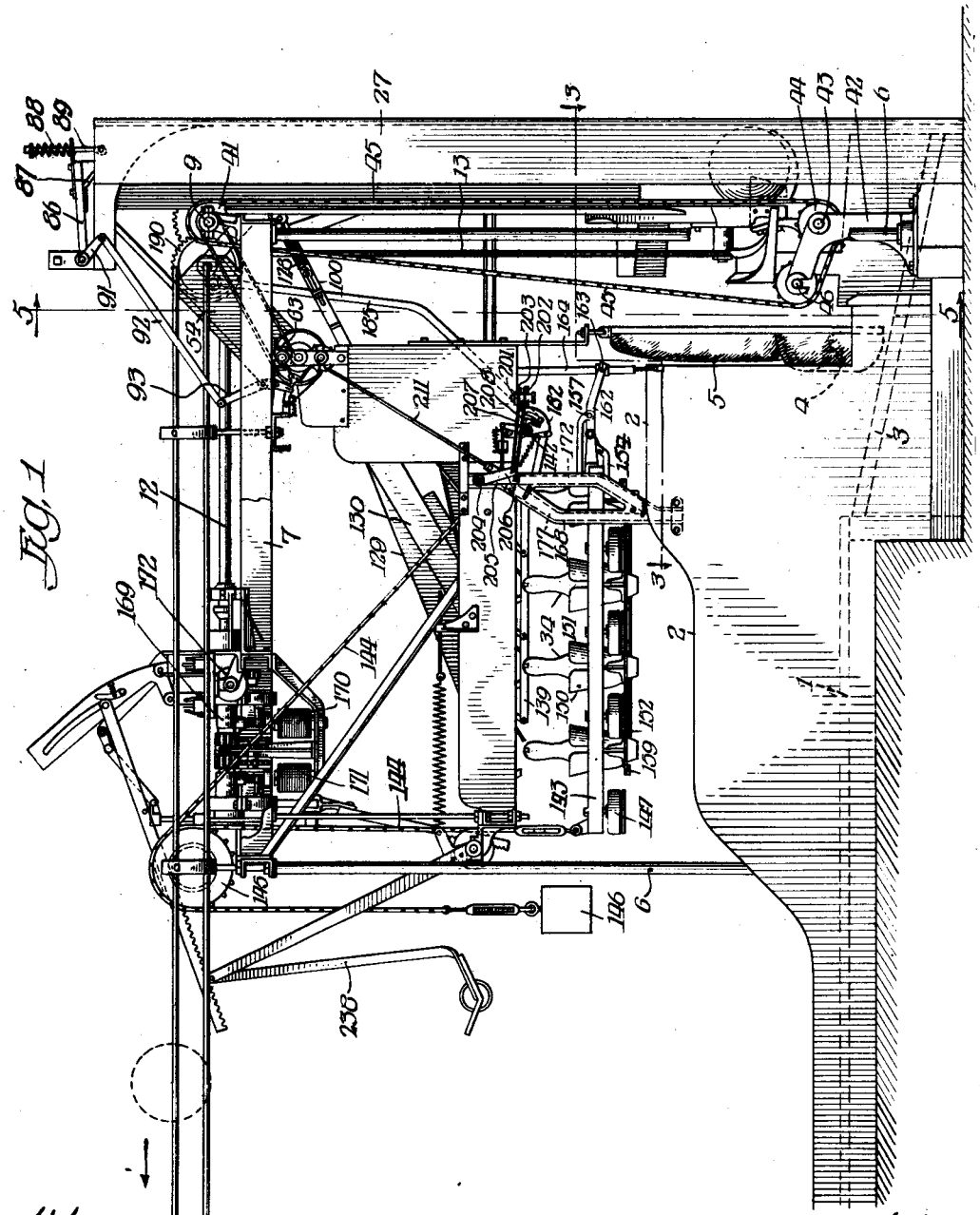

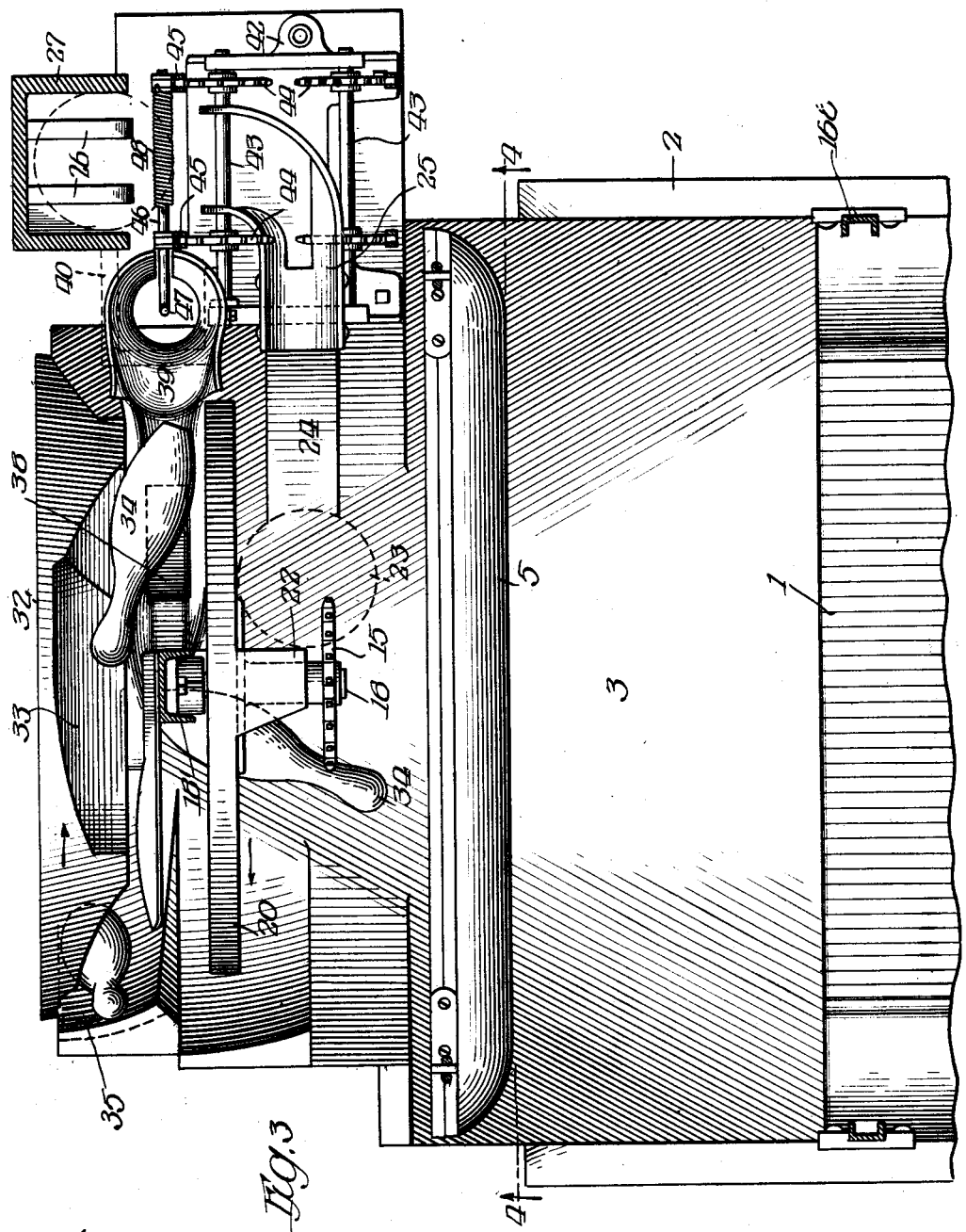

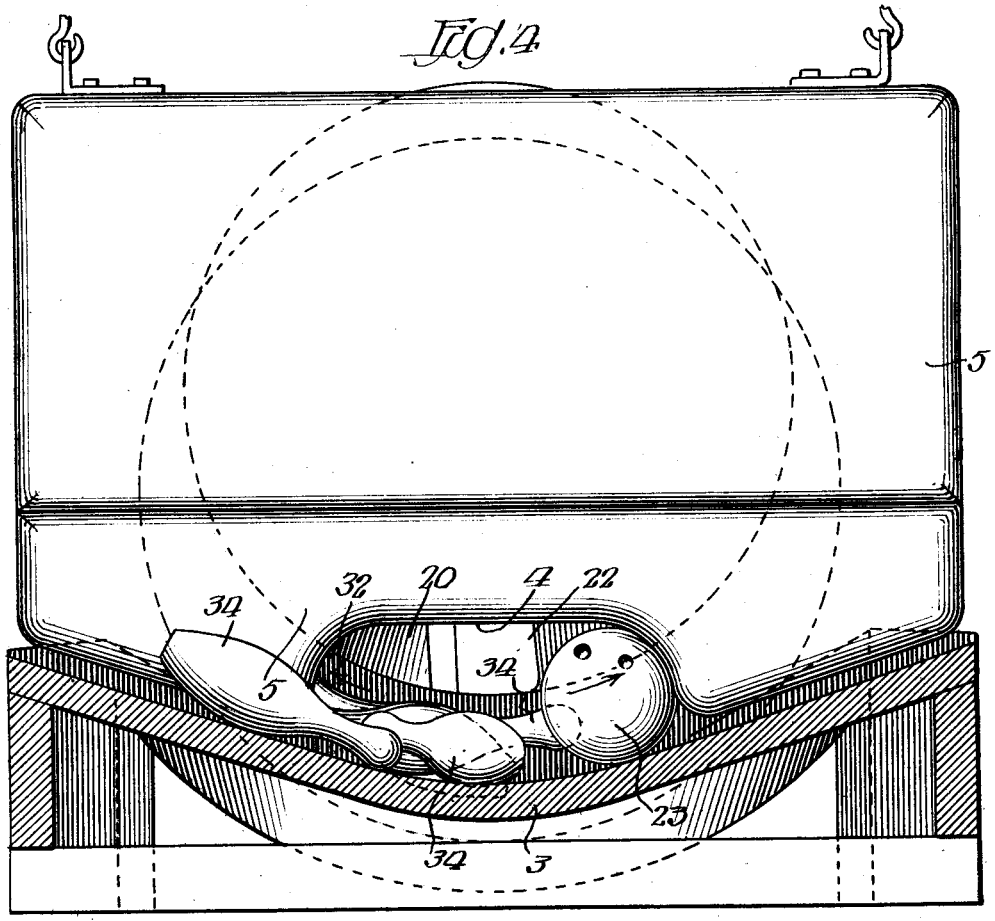

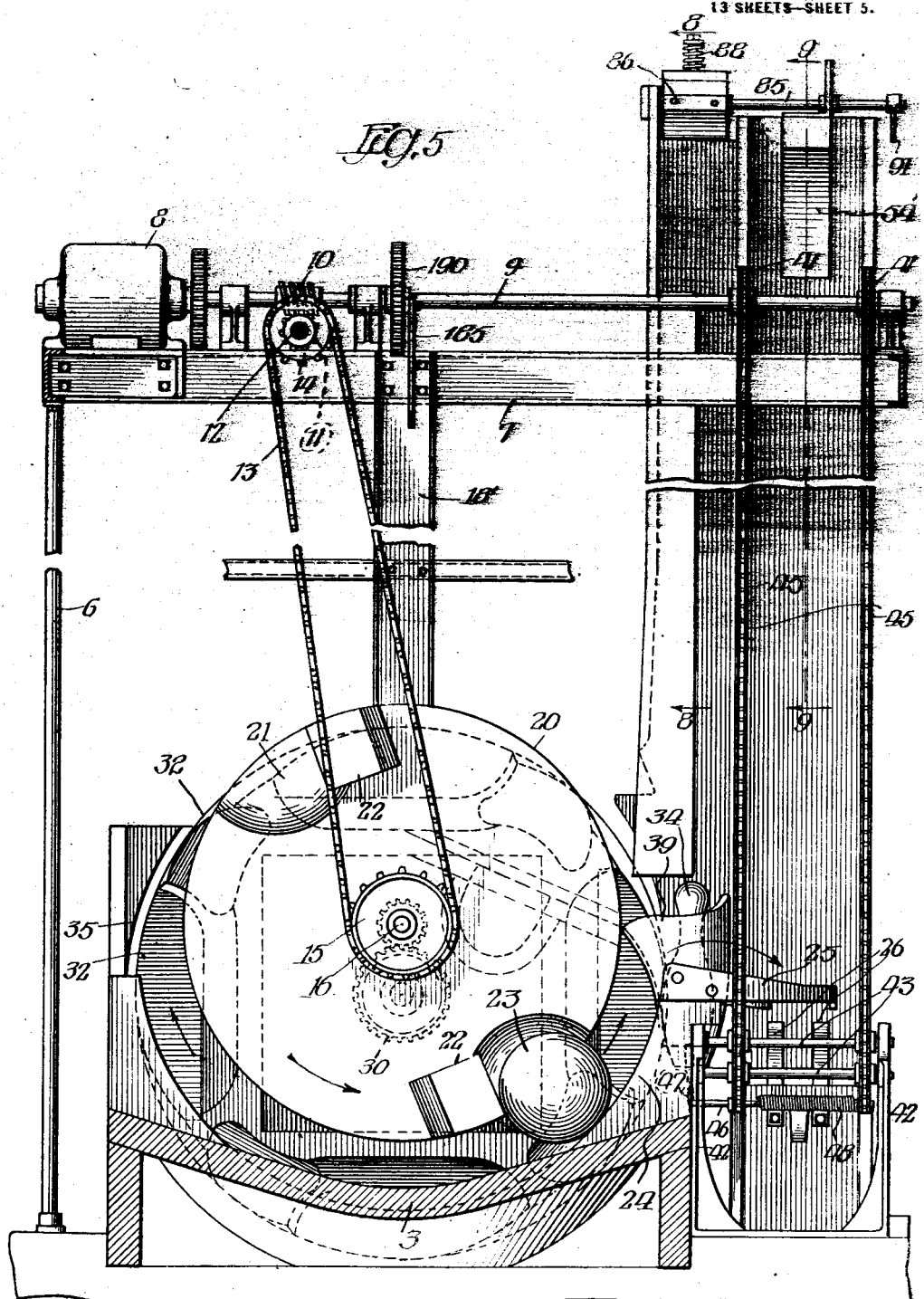

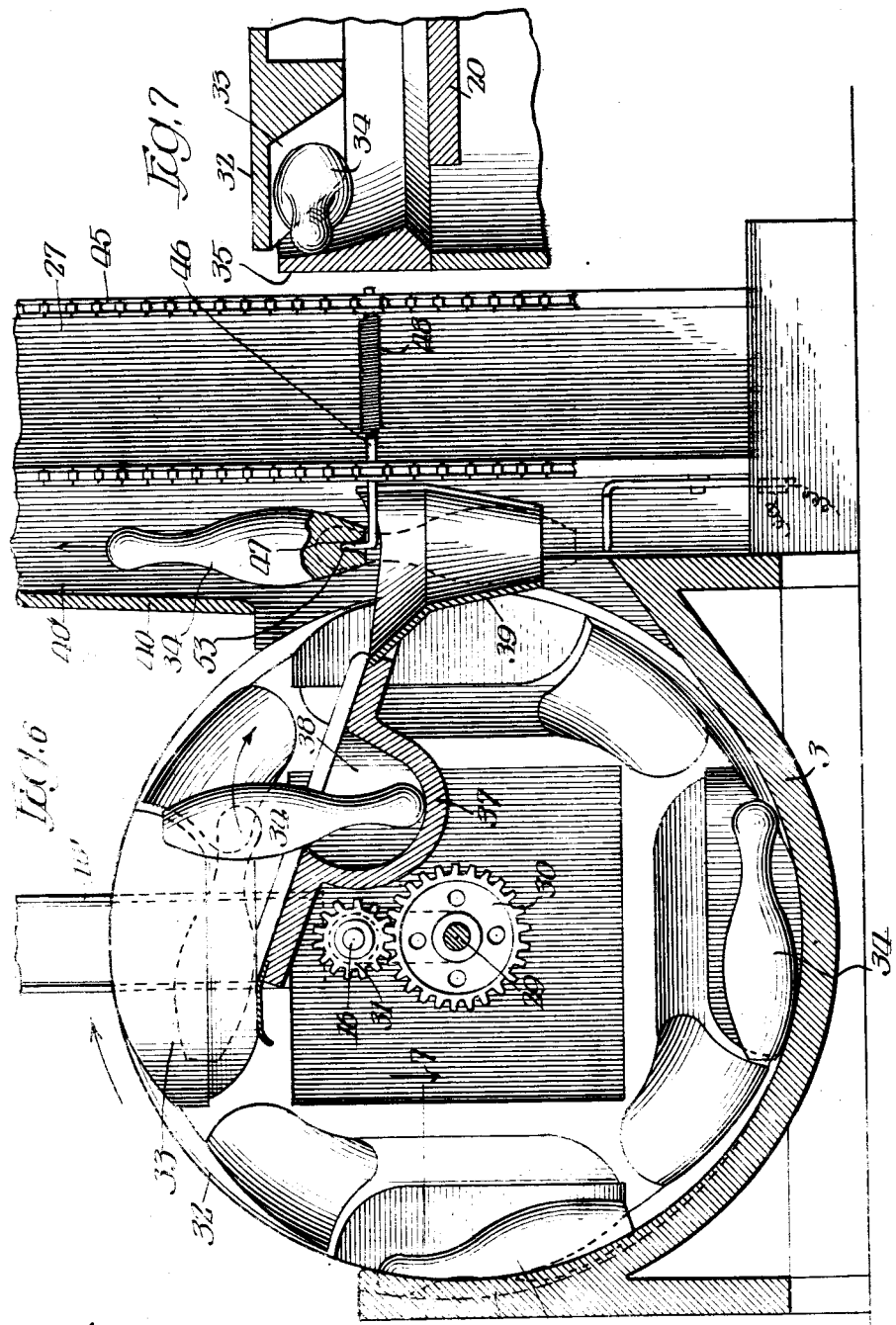

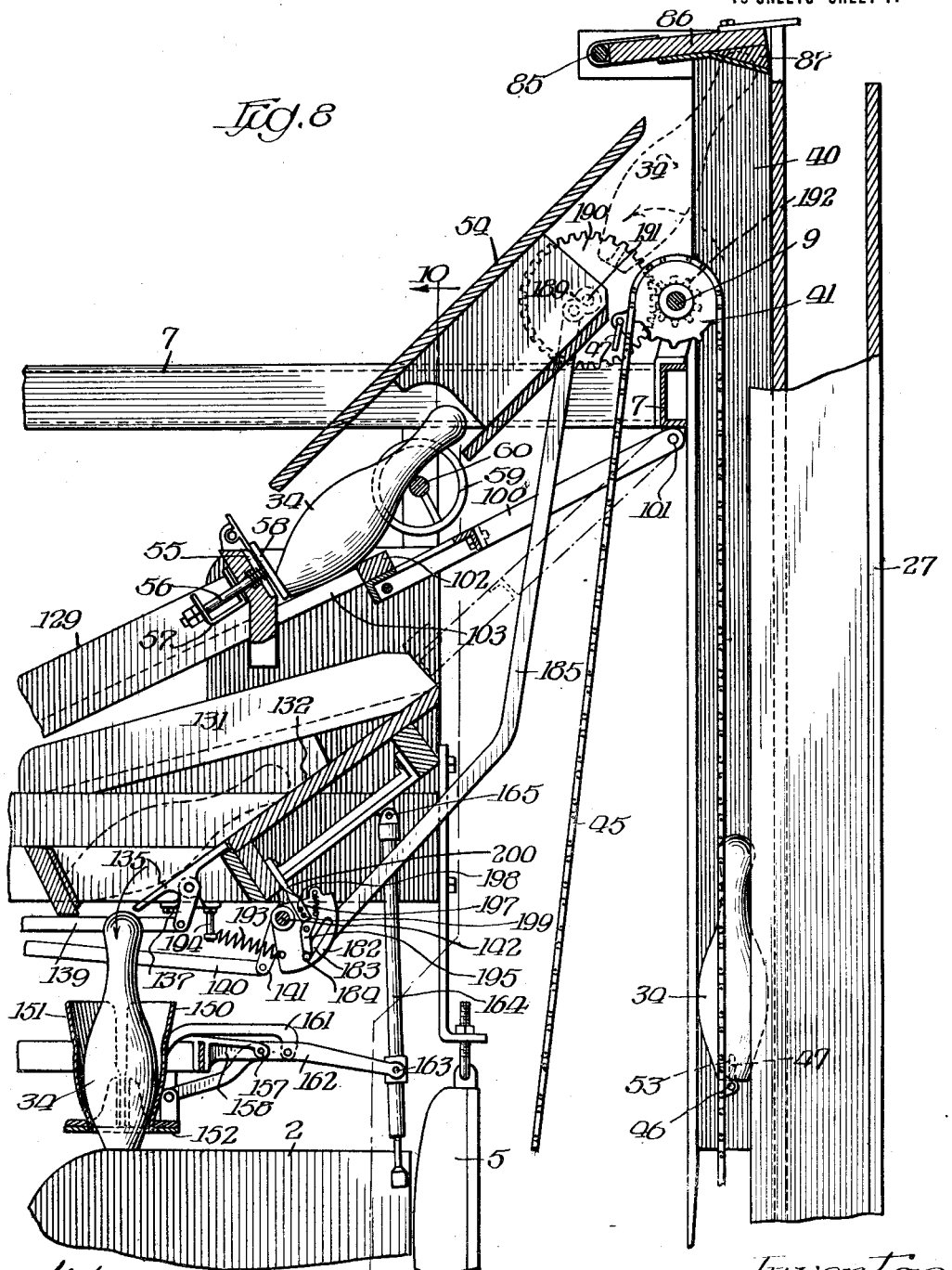

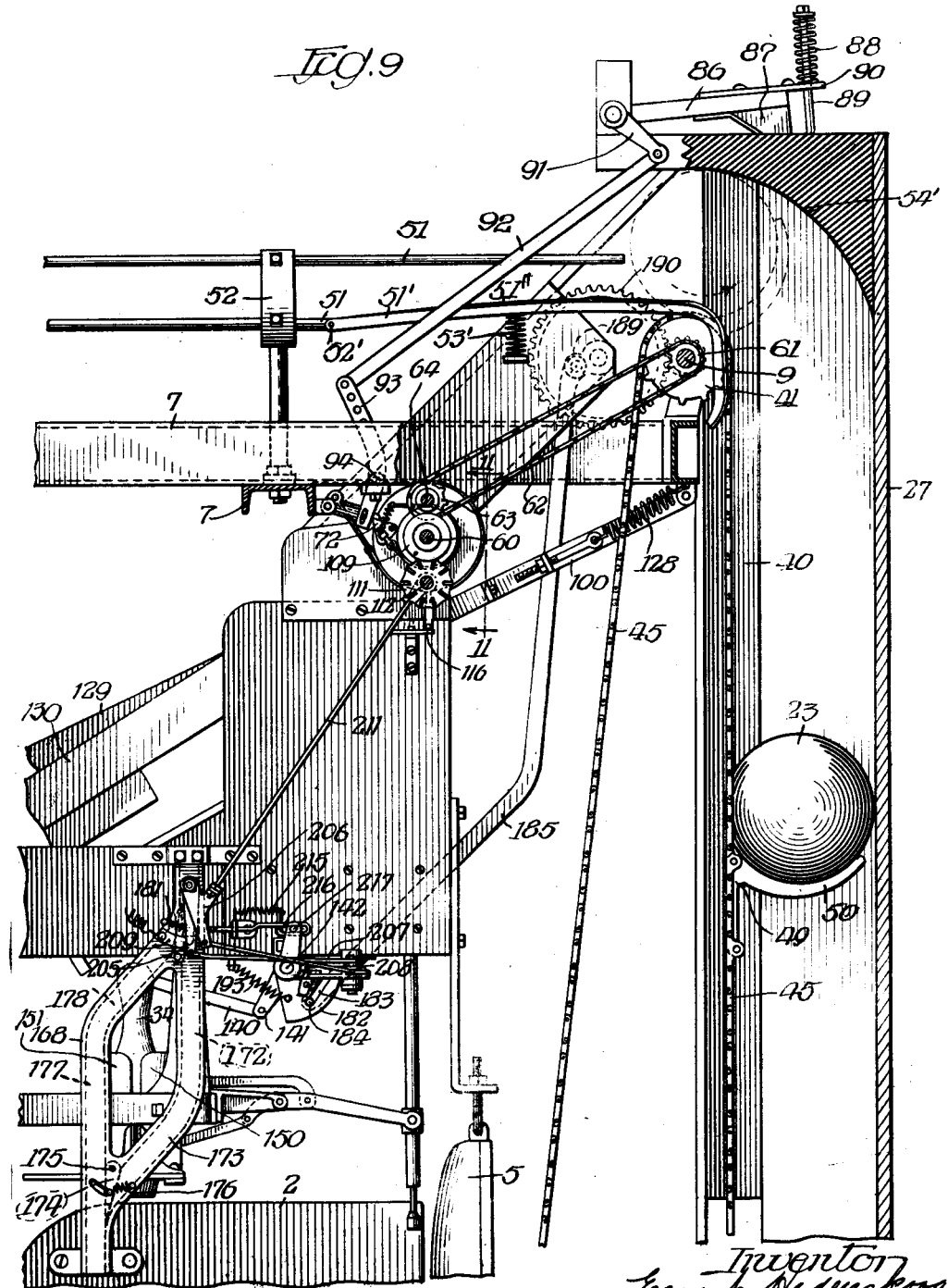

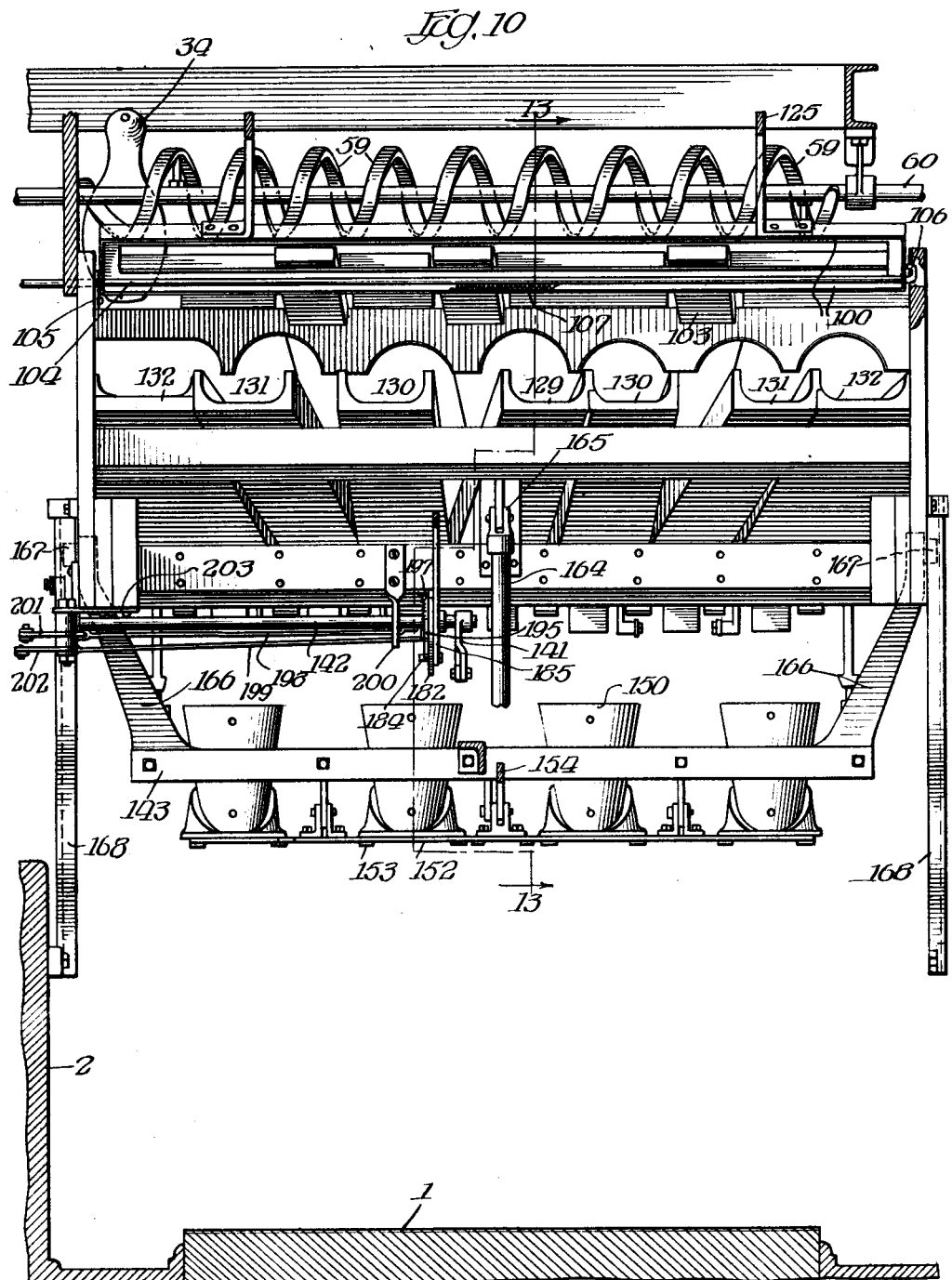

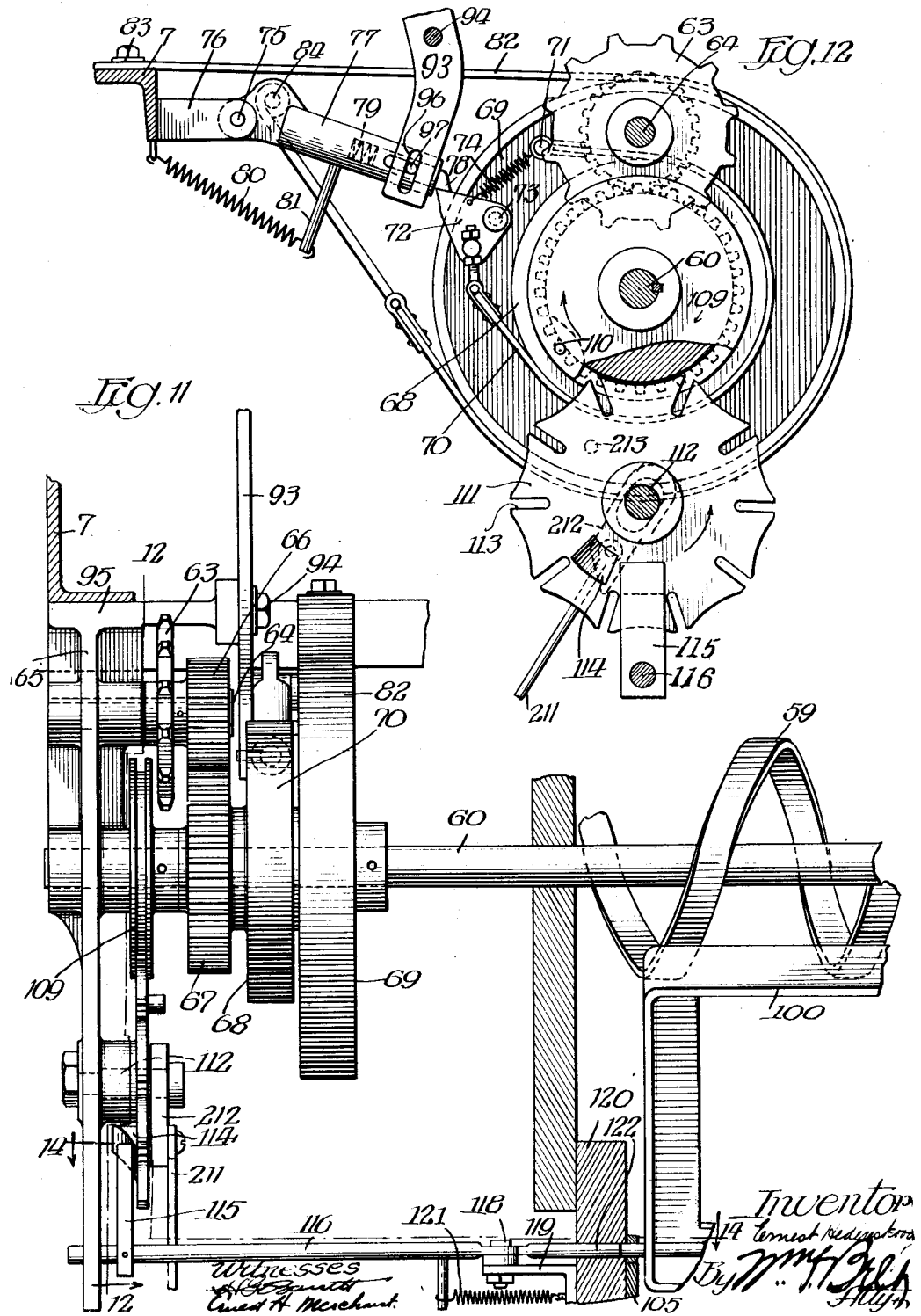

E. HEDENSKOOG.
AUTOMATIC PIN SETTING MACHINE.
APPLICATION FILED FEB. 28, 1916.
1,190,650.
Patented July 11, 1916.
13 SHEETS—SHEET 11.
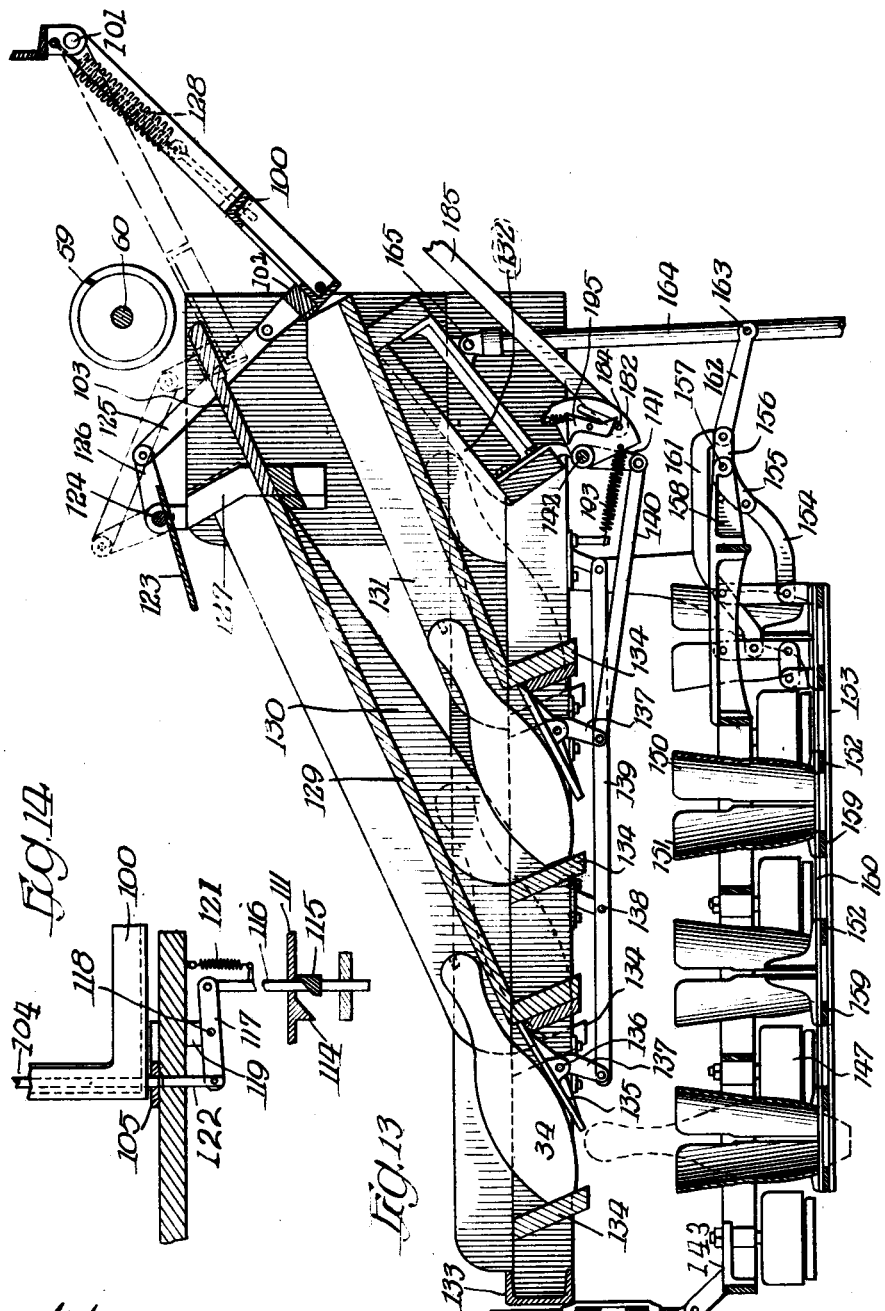

E. HEDENSKOOG.
AUTOMATIC PIN SETTING MACHINE.
APPLICATION FILED FEB. 28, 1916.
1,190,650.
Patented July 11, 1916.
13 SHEETS—SHEET 12.
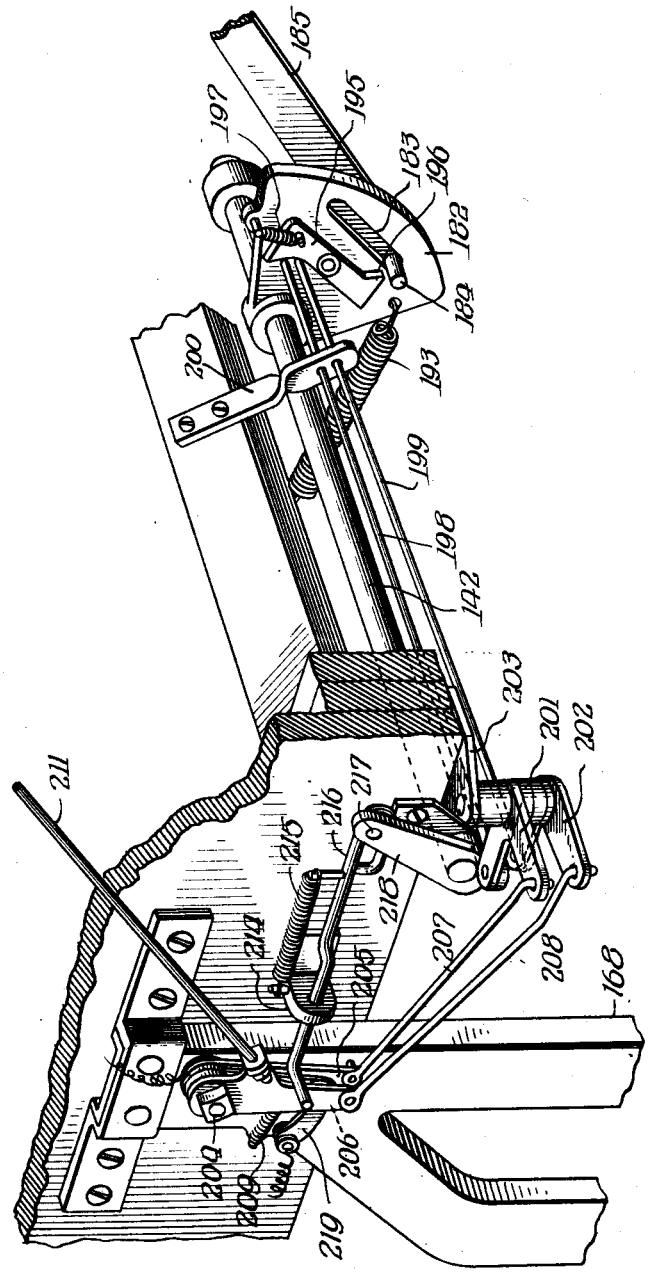

E. HEDENSKOOG.
AUTOMATIC PIN SETTING MACHINE.
APPLICATION FILED FEB. 28, 1916.
1,190,650.
Patented July 11, 1916.
13 SHEETS—SHEET 13.
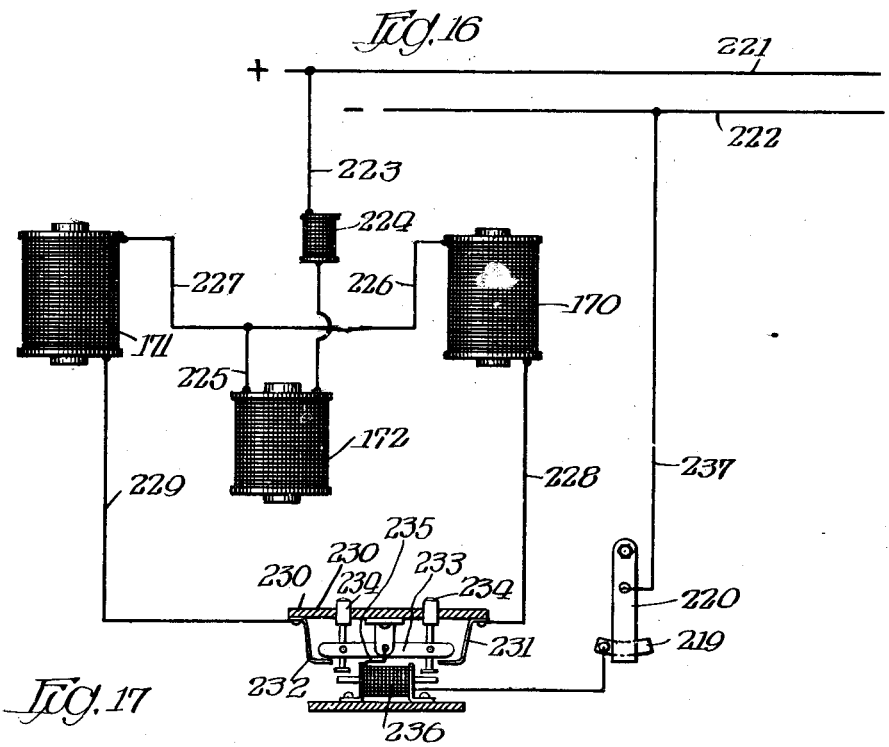
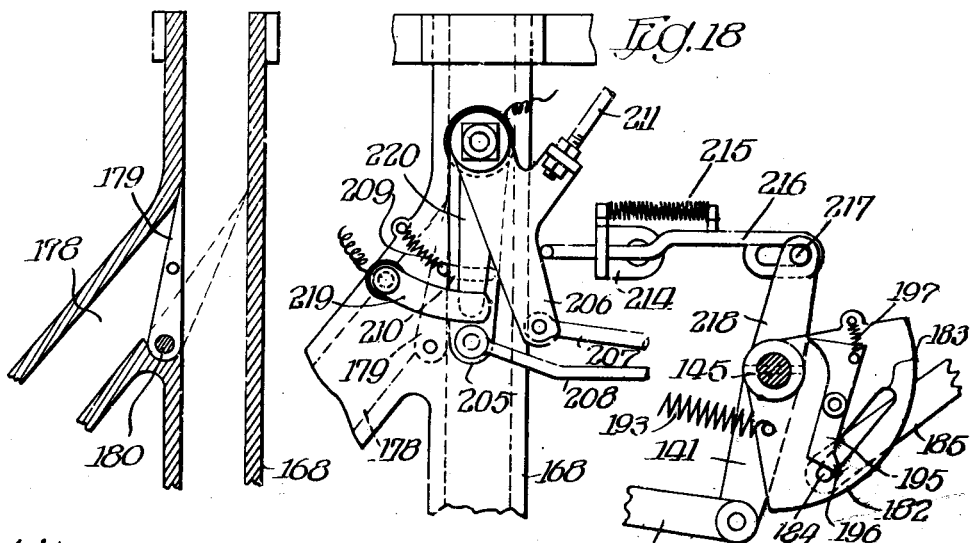
Witnesses:
Inventor
Ernest Hedenskoog
By
Atty.

UNITED STATES PATENT OFFICE.

ERNEST HEDENSKOOG, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

AUTOMATIC PIN-SETTING MACHINE.

1,190,650.            Specification of Letters Patent.        Patented July 11, 1916.

Application filed February 28, 1916. Serial No. 80,835.

*To all whom it may concern:*

Be it known that I, ERNEST HEDENSKOOG, a citizen of the United States, residing at Muskegon, in the county of Muskegon and State of Michigan, have invented certain new and useful Improvements in Automatic Pin-Setting Machines, of which the following is a specification.

This invention relates in general to machines for automatically setting pins upon a bowling alley and returning the balls to the player's position and more particularly to certain novel mechanism, devices, combinations and arrangement of parts which may be incorporated in the machine which forms the subject-matter of my application filed June 6, 1914, Serial No. 843,372, entitled Automatic pin setting machines.

The principal object of my present invention is the provision of novel means for separating and elevating the pins and balls and delivering the pins to the setter and the balls to the ball return.

A further object of my invention is the provision of novel means for arranging the pins upon and releasing them from the assembly shelf as well as novel means for controlling the delivery of pins to the setter, whereby the structure and mode of operation of my automatic pin setting machine as previously disclosed is materially simplified and improved.

Further objects and advantages of my invention will be apparent as it is better understood by reference to the following specification when read in connection with the accompanying drawing, illustrating the preferred embodiment thereof, in which—

Figure 1 is a side elevation of the complete pin setting machine; Fig. 2 is a vertical longitudinal section through the rearward portion of the mechanism illustrating the means for separating the pins and balls and the setter in position to spot the pins on the alley bed; Fig. 3 is a horizontal section on the line 3—3 of Fig. 1; Fig. 4 is a vertical section on the line 4—4 of Fig. 3; Fig. 5 is a vertical section on the line 5—5 of Fig. 1; Fig. 6 is a vertical section on the line 6—6 of Fig. 2; Fig. 7 is a horizontal section on the line 7—7 of Fig. 6; Fig. 8 is a vertical section on the line 8—8 of Fig. 5; Fig. 9 is a vertical section on the line 9—9 of Fig. 5; Fig. 10 is a vertical section on the line 10—10 of Fig. 8; Fig. 11 is an enlarged vertical section on the line 11—11 of Fig. 9; Fig. 12 is a vertical section on the line 12—12 of Fig. 11; Fig. 13 is a vertical section on the line 13—13 of Fig. 10; Fig. 14 is a diagrammatic horizontal section on the line 14—14 of Fig. 11; Fig. 15 is a detail in perspective of the controlling means for the distributer frame; Fig. 16 is a diagrammatic illustration of the electrical controlling circuits; Fig. 17 is an enlarged detail in vertical section of a portion of one of the guiding cam plates for the pin setter, and Fig. 18 is a detail in elevation of the means for controlling the distributer frame and the circuit breaker to prevent the actuation of the pin setter when empty.

Referring to the drawing, 1 indicates an alley bed and 2 the kickbacks, both of which are of usual construction. The pit rearwardly of the bed 1 is provided with a bottom 3 sloping from the bed 1 and the kickbacks 2 and converging toward an opening 4 in a pad 5 which protects the mechanism rearwardly thereof. A frame comprising the upright members 6 and the horizontal channels 7 is arranged over the end of the bed and the pit to support the various parts of the mechanism presently to be described.

A motor 8 (Fig. 5) is supported on the frame and drives a transversely extending shaft 9 provided with a worm 10 meshing with a worm gear 11 on a shaft 12 extending longitudinally of the machine. A chain 13 is disposed about a sprocket 14 secured to the shaft 12 and a sprocket 15 secured to a shaft 16 journaled in a bearing 17 (Fig. 2) in a stationary member 18 secured to a channel 18′ depending from the channel 7 of the frame at the rearward end of the machine.

Secured to a flange 19, preferably formed integral with the sprocket 15, is a member 20 having a plurality of recesses 21 in its face and a plurality of contiguous projecting abutments 22. The member 20 is, during the operation of the machine, rotated in the direction indicated by the arrow on Fig. 5 and as the member 20 rotates the abutments 22 engage the balls 23 and by coöperation with the portion 24 (Fig. 5) of the casing which partially surrounds the member 20 lifts the balls and delivers them onto an inclined runway 25 from which they roll onto a pair of horizontal supporting members 26 (Fig. 3) within the conveyer casing 27 and in the path of the conveyer presently to be described.

Mounted in a bearing 28 in the stationary member 18 is a stub shaft 29 provided with a gear 30 meshing with a pinion 31 on the shaft 16 and rotating in the opposite direction. Secured to the gear 30 is a member 32 having a plurality of pockets 33 in its face, each of the pockets 33 being adapted to receive a pin 34, which, as will be clearly understood by reference to Fig. 2, may pass beneath the member 20 which retains the balls 23. As the member 32 rotates in the direction indicated by the arrow in Fig. 6, the pins 34 are lifted in coöperation with the portion 35 (Fig. 7) of the casing partially surrounding the member 32. A guide plate 36 (Fig. 2) is secured to the stationary member 18 and coöperates with the member 32 to retain the pins after they have passed beyond the portion 35 of the casing.

In order that the pins 34 may properly coöperate with the conveyer presently to be described it is essential that the pins be delivered thereto with their bases downwardly disposed and accordingly a member 37 (Fig. 6) is secured to the stationary member 18 to provide a recess 38 of sufficient width only to receive the heads of the pins 34. If the pins 34 approach the recess 38 with their heads foremost the heads will drop into the recess 38 and upon the continued movement of the member 32 the pins will turn completely over and will be delivered with their bases foremost as desired. If the pins 34 approach the recess 38 with their bases foremost they will pass over the recess 38 without being reversed. The pins 34 are delivered from the member 32 to a casing 39 disposed within the conveyer casing 40.

Secured to the shaft 9 are pair of sprockets 41 (Fig. 5). Mounted in suitable brackets 42 (Figs. 1 and 3) rearwardly of the pit are a pair of shafts 43, each provided with a pair of sprockets 44. Conveyer chains 45 are disposed about the sprockets 41 and 44 and are constantly driven through the shaft 9 by the motor 8. Secured to the conveyer chains 45 is a member 49 (Fig. 9) having a pair of spaced arms 50 adapted to pass between the horizontal supporting members 26 to pick up a ball 23 resting thereon and raise it to the upper end of the casing 27 where it is delivered to the ball return track 51 supported by yokes 52 on a horizontal channel 7 of the frame. The lower rails 51' of the ball return track adjacent the upper end of the conveyer casing 27 are pivoted at 52' and are biased in an upward direction by springs 53'. The rails 51' are provided with rubber faces 51" which in coöperation with the smooth curved guide 54' at the upper end of the conveyer casing 27 give to the balls 23 a whirling motion in the direction of the arrow on Fig. 9, thus increasing the speed with which the balls are projected along the ball return track 51.

A rod 46 (Fig. 6) is rotatably mounted in the conveyer chains 45, projects therefrom into the conveyer casing 40 and is provided with an upturned end 47. A spring 48, surrounding the rod 46 and connected thereto at one end, is connected at its opposite end to one of the conveyer chains 45 and serves to normally maintain the end 47 of the rod 46 in the position indicated in Fig. 6. Each of the pins 34 is provided with a recess 53 in its base adapted to be engaged by the end 47 of the rod 46 (Fig. 6) so that as the conveyer chains 45 advance the pin 34 is lifted from the casing 39 through the conveyer casing 40 and delivered at the upper end thereof, its base foremost, to a chute 54 (Fig. 8). It will be noted that the spring 48 allowed the rod 46 to rotate as the conveyer chain 45 passes over the sprockets 41 but returns the rod 46 to its normal position as soon as it is released from the socket 53 of the pin 34.

From the chute 54 the pin 34 is delivered to the assembly shelf, a plate 55 (Fig. 8), secured to a rod 56 slidably mounted in a bracket 57 and resiliently held by a spring 58, being disposed at the foot of the chute 54 to absorb the shock as the pin 34 descends therefrom. Above the assembly shelf a screw conveyer 59 is secured to a shaft 60 and the pin 34 is received between the convolutions of the screw conveyer 59 (Fig. 10) in position to be advanced along the assembly shelf when the screw conveyer 59 is rotated.

Secured to the shaft 9 is a sprocket 61 (Fig. 9) and a chain 62 is disposed about the sprocket 61 and a sprocket 63 on a stub shaft 64 (Figs. 11 and 12) mounted in a suitable bracket 65 supported from one of the channels 7 of the frame. A pinion 66 secured to the shaft 64 meshes with a gear 67 loosely mounted on the shaft 60 and provided with a brake drum 68, preferably formed integrally therewith. A brake drum 69 is secured to the shaft 60. One end of a brake band 70 is secured at 71 to the brake drum 69 and surrounds the brake drum 68, the other end of the brake band 70 being connected to a pawl 72 pivotally mounted at 73 on the brake drum 69 and biased by a spring 74 to position to maintain the brake band 70 in close coöperative relation with the brake drum 68, whereby the latter may be locked to the brake drum 69 and the shaft 60. Pivotally mounted at 75 on an arm 76, secured to one of the channels 7 of the frame, is a member 77 having a tooth 78 normally forced by a spring 79 into the path of the pawl 72. A spring 80 secured at one end to the channel 7 and at the other to an arm 81 on the member 77 tends to draw the member 77 downwardly from the position indicated in Fig. 12. One end of a brake band 82 is secured at 83 to the channel 7 and surrounds the brake drum 69, the opposite end of the brake band 82 being connected at 84 to the member 77.

Pivotally mounted at 85 (Figs. 8 and 9) at the upper end of the conveyer casing 40 is a member 86, provided with a bumper 87, resiliently held in the path of the ascending pins 34 by a spring 88 surrounding a bolt 89 secured to the upper end of the casing and engaging an arm 90 on the member 86. A crank arm 91, connected to the member 86 is connected by a link 92 to a lever 93 pivotally mounted at 94 (Figs. 11 and 12) on an arm 95 of the bracket 65. The lever 93 is provided with a slot 96 engaging a pin 97 on the spring-pressed tooth 78 and when a pin 34 engages the bumper on the member 86 the lever 93 will be rocked to withdraw the tooth 78 from engagement with the pawl 72. The spring 74 will immediately tighten the brake band 70 on the brake drum 68 to lock the conveyer shaft 69 to the constantly driven gear 67 and simultaneously the spring 80 will draw the member 77 downwardly to release the brake band 82 from the brake drum 69. As soon as the shaft 60 has made a complete revolution the pawl 72 will again engage the tooth 78, moving the member 77 to force the brake band 82 into engagement with the brake drum 69 and to simultaneously release the brake band 70 from the brake drum 68. By this means the shaft 60 is caused to make a single complete revolution whenever a pin 34 is deposited in the chute 54 and consequently each pin 34 as received on the assembly shelf is moved laterally a distance equal to the pitch of the screw conveyer 59.

The assembly shelf comprises a frame 100 (Figs. 8 and 13), of angle iron, pivotally mounted at 101 on a transverse channel 7 of the frame and provided at its forward end with a plurality of extensions 102 adapted to project between the stationary shelf members 103 which support the three pins destined to occupy the foremost positions on the alley bed. The frame 100 is normally held in position to support the pins intermediate the stationary members 103 by a rod 104 (Fig. 10) carried by the frame and extending transversely of the machine, one end of the rod being normally disposed in an opening in a stationary plate 105 (Figs. 10 and 14) and the opposite end being hook-shaped to engage an opening in the stationary plate 106 (Fig. 10). A spring 107 normally maintains the rod 104 in locking position.

Secured to the shaft 60 is a grooved wheel 109 (Figs. 11 and 12) having a pin 110 on its periphery adapted to coöperate with a Geneva wheel 111 mounted on a stub shaft 112 beneath the shaft 60. The Geneva wheel 111 is provided with ten notches 113 on its periphery which are necessarily engaged by the pin 110 on the wheel 109 and it will be readily understood that when the shaft 60, carrying the wheel 109, has made ten complete revolutions the Geneva wheel 111 will have been actuated to make one complete revolution. A cam nose 114 on the face of the Geneva wheel 111 coöperates at each complete revolution thereof with an arm 115 secured to a rod 116 which is connected at its ends to a lever 117 (Figs. 11 and 14), pivotally mounted at 118 on a bracket 119. A spring 121 normally maintains the rod 116 in the position indicated in Figs. 11 and 14. A pin 122 connected to the opposite end of the lever 117 engages the end of the rod 104. When the Geneva wheel 111 has completed one revolution the rod 104 will be actuated against its spring 107 to free the frame 100 and inasmuch as the Geneva wheel 111 does not complete its revolution until the tenth pin has been received on the assembly shelf it will be apparent that the frame 100 is allowed to drop under the weight of the pins carried thereon whenever a complete set of pins has been assembled.

The three pins supported on the stationary members 103 are released by gates 123 (Fig. 13) pivotally mounted at 124 and actuated through links 125 and levers 126 by movement of the frame 100. It is to be understood that between the gates 123 abutments 127 are arranged to limit the forward movement of the pins assembled on the assembly shelf. Springs 128 (Fig. 9), secured to a transverse channel 7 and to the frame 100 at either end thereof, return the frame 100 to normal position after the pins have been released therefrom in which position the frame 100 is locked by the rod 104, previously described. From the stationary members 103 the pins, when released by the gates 123, descend in chutes 129 and 130 to the distributer frame in the relative positions which they are to assume when delivered upon the alley bed. The pins supported by the frame 100 are delivered onto chutes 131 and 132 leading to the positions on the distributer frame corresponding to the two rearmost rows of pins of a set.

The distributer frame is stationary and consists of channels 133 (Fig. 13) forming the body thereof and is provided with transverse abutments 134 disposed in front of the ends of the chutes 129, 130, 131 and 132. The abutments 134 are adapted to be engaged by the bases of the pins to retain them in the desired position. The openings between the ends of the chutes 129, 130, 131 and 132 and the abutments 134 are closed by gates 135 pivotally mounted on rods 136 extending transversely of the distributer frame. Levers 137 rigidly connected to the gates 135, are connected by transverse rods 138 which are in turn connected by a longitudinally extending link 139. A link 140 connects the link 139 to a lever 141 (Figs. 10 and 17) secured to a shaft 142, which is rocked at intervals by mechanism presently to be described to release the pins from the distributer frame whereby they are allowed to descend into the pin setter.

The pin setter comprises a triangular-shaped frame 143 (Fig. 1) supported at its corners by chains 144 disposed over sprockets 145 mounted on a transversely extending shaft at the forward end of the frame. A counterweight 146 is secured to the ends of the chains 144 and balances the weight of the frame 143 so that a minimum amount of power is required to actuate the pin setter. A plurality of electro-magnets 147 are secured to the setter frame in spaced relation corresponding to the relative positions of a set of pins on the alley bed. The electro-magnets 147 are identical with those described in my above-mentioned application and are controlled in a similar manner, their function being to lift the standing pins from the alley bed during the deadwood-removal operation by coöperation with the metallic inserts 148 (Fig. 2) in the heads of the pins.

Slidably supported on suitable brackets 149 (Fig. 2) depending from the frame 143 are a plurality of relatively movable semi-casings 150 and 151 arranged in pairs, each pair being disposed rearwardly of one of the magnets 147. The semi-casings 150 are connected by transverse members 152 (Fig. 13) and longitudinal members 153 to a link 154 which is in turn connected to an arm 155 of a bell-crank lever 156 pivotally mounted at 157 on an arm 158 extending rearwardly from the frame 143. The semi-casings 151 are connected by transverse members 159 and longitudinal members 160 to a link 161, which is in turn connected to the arm 162 of the bell-crank lever 156. The arm 162 of the bell-crank lever 156 is connected at 163 to a rod 164 pivotally connected at 165 to a stationary portion of the frame. The point of connection 163 of the lever 156, with the rod 164 being fixed, the links 154 and 161 are necessarily actuated as the setter frame descends to separate the semi-casings 150 and 151, thus freeing the pins as they come to rest upon the alley bed. The frame 143 is provided at its rearward corners with upwardly and outwardly extending arms 166 (Fig. 10) provided at their extremities with rollers 167 arranged to operate in guide cam plates 168 (Fig. 9) supported on the kickbacks 2 at either side of the frame.

The operation of the machine requires two distinct movements of the pin setter. In the new set operation the setter descends until the semi-casings 150 and 151 rest nearly on the alley bed, whereas in the deadwood-removal operation the setter descends merely until the electro-magnets 147 contact with the tops of the pins standing on the alley. The setter frame is actuated to carry out the movements indicated through suitable connections with an operating and timing mechanism 169 (Fig. 1) driven by the shaft 12 which is identical in the present structure with that disclosed in my previously-mentioned application, it having been found in practice that this operating and timing mechanism is entirely satisfactory for the purpose intended. It is, therefore, unnecessary to describe the mechanism 169 in detail since reference may be had to the application aforesaid for the structure thereof. The new set and deadwood-removal operation controlling magnets 170 and 171, respectively, and the main clutch magnet 172 forming a part of the mechanism 169 will, however, be referred to hereafter.

In the new set operation the rollers 167 descend in the slots 172 of the cam plates 168 at the right of Fig. 9 into the lower oblique slots 173 and past gates 174 pivotally mounted at 175 and normally held in the position indicated by springs 176. The rollers 167 then pass into the vertical slots 177 at the left of Fig. 9 and continue to descend in the vertical slots 177 until the setter is disposed adjacent the alley bed. Upon upward movement of the setter the gates 174 prevent the entrance of the rollers 167 into the lower oblique slots 173 and hence the rollers pass upwardly in the slots 177 into the upper oblique slots 178 and past the gates 179 (Fig. 17) pivotally mounted at 180 and normally held in the position indicated in Fig. 9 by springs 181, thence into the vertical slots 172 and upward to the normal position of the setter. In the deadwood-removal operation the rollers 167 descend merely in the vertical slots 172 which are of sufficient length to allow the electro-magnets 147 to engage the tops of the pins standing on the alley bed and then move upwardly in the same slots without passing into the oblique slots.

It will be readily understood that the cam plates 168 guide the pin setter in a combined vertical and forward movement in the new set operation and a vertical movement only in the deadwood-removal operation. The forward movement of the pin setter in the new set operation has for its object the placing of the pins in position directly beneath the normal position of the electro-magnets 147 when the setter is in its upper position in order that as the setter descends in the deadwood-removal operation the pins will be disposed to be engaged and picked up by the electro-magnets 147 which are energized through suitable electrical connections and attract the metal cores 148. It will be apparent that as the rollers 167 approach the bottoms of the vertical slots 177 in the new set operation the bell-crank lever 156 will be rocked on its pivot 157, thereby separating the semi-casings 150 and 151 to deposit the pins supported thereby upon the alley bed.

The means for rocking the shaft 142 to release the pins from the distributer frame and allow them to descend into the pin setter comprises a quadrant 182 (Fig. 15) secured to the shaft 142 and provided with a slot 183 in which is disposed a pin 184 secured to a rod 185 which extends upwardly (Fig. 8) and is connected at its upper extremity to a crank 189 secured to a gear 190 on a stub shaft 191. The gear 190 is actuated by a pinion 192 on the shaft 9 and the pin 184 is, therefore, constantly vibrated in the slot 183. A spring 193 secured to the quadrant 182 and to a bracket 194 depending from the distributer frame normally maintains the quadrant 182 in position to hold the gates 135 in closed position (Fig. 13).

Pivotally mounted on the quadrant 182 is a latch 195 (Fig. 15) having a tongue 196 adapted to overlie the slot 183 in the path of the pin 184 when actuated by a spring 197, secured to the latch 195 and to the quadrant 182, as indicated in Fig. 18. When in this position the tongue 196 is disposed to lock the pin 184 to the quadrant 182 so that upon upward movement of the rod 185 the shaft 142 is rocked in an anti-clockwise direction to rotate the gates 135 about their pivots 136 and release the pins from the distributer frame. The latch 195 is normally held in inoperative position by two rods 198 and 199 (Fig. 15) the ends of which extend into the path of movement of the latch 195 and which return the latch 195 to inoperative position when the shaft 142 is rocked in a clockwise direction to close the gates 135. The rods 198 and 199 are supported in a bracket 200 depending from the distributer frame and are connected at their ends to bell-crank levers 201 and 202, respectively, both pivotally mounted independently of each other on a bracket 203 projecting from a side member of the frame.

Pivotally mounted at 204 on one of the cam plates 168 are a pair of levers 205 and 206. Links 207 and 208 connect the levers 205 and 206, respectively, to the bell-crank levers 201 and 202. The lever 205 is adapted to be actuated by a pin 209 projecting from the gate 179 through a slot 210 in the cam plate 168 and it will be readily understood that when the pin setter is actuated to accomplish the new set operation and returns past the gate 179 the lever 205 will be turned on its pivot 204 and through the link 207 will actuate the bell-crank lever 201 to withdraw the end of the rod 198 from the path of the latch 195. A lever 206 is connected by an upwardly directed rod 211 to a slotted cam plate 212 (Figs. 11 and 12) disposed about the stub shaft 112 in the path of a pin 213 on the Geneva wheel 111. Upon each complete revolution of the Geneva wheel 111 the pin 213 will engage the cam plate 212 riding up the inclined end thereof and forcing the cam plate 212 toward the shaft 112 to draw the rod 211 upwardly, thus rotating the lever 206 about its pivot 204. The link 208 will consequently rotate the bell-crank lever 202 and thereby withdraw the end of the rod 199 from the path of the latch 195. As previously stated, when the latch 195 is freed from the ends of the rods 198 and 199 the tongue 196 will move into the path of the pin 184 and the quadrant 182 will be actuated to rock the shaft 142 and thereby open the gates 135 to release the pins from the distributer frame.

Slidably mounted in a bracket 214 and normally biased in the direction of the levers 205 and 206 by a spring 215 is a member 216, one end of which engages the levers 205 and 206, the other end being provided with a slot engaging a pin 217 on a crank 218 secured to the shaft 142. It will be apparent that when the shaft 142 is rocked, as previously described, the member 216 will return the levers 205 and 206 to their normal position, thus again disposing the ends of the rods 198 and 199 in the path of the latch 195 so that upon the return of the quadrant 182 to its normal position through the continued rotation of the crank 189 the latch 195 will be forced to its inoperative position and the pin 184 on the rod 185 will thereafter oscillate in the slots 183 until the rods 198 and 199 are again actuated to release the latch 195.

The purpose of the foregoing mechanism is to insure the delivery of pins to the pin setter as rapidly as the pins are assembled in sets upon the assembly shelf. It will be noted by reference to Fig. 12 that the pin 213 on the Geneva wheel 111 follows in sequence of operation the cam nose 114 thereon which actuates the mechanism to release the pins from the assembly shelf. If, therefore, in the operation of the machine the distributer frame does not contain a set of pins when the pin setter passes the gate 179 after depositing a set of pins on the alley bed the lever 205 will be set to release the latch 195 and will remain set until a set of pins has been assembled on the assembly shelf and the Geneva wheel 111 has been consequently rotated sufficiently to release the pins from the shelf. Directly following the release of the pins from the assembly shelf the pin 213 on the Geneva wheel 111 will actuate the rod 211 to set the lever 206 and thereby free the latch 195 in the manner previously described. The pins which have been released from the assembly shelf and deposited in the distributer frame will thereupon be deposited in the pin setter.

The electrical circuits employed to control the actuating and timing mechanism 169 are substantially identical with those disclosed in the prior application above referred to and need not, therefore, be described at length in the present application. In order that the operator may be warned and prevented from operating the pin setter in an attempt to deposit pins upon the alley bed before pins have been released from the distributer frame and deposited in the pin setter in the manner just described, I provide a contact 219 mounted upon and insulated from the cam plate 168 and a similar contact 220 secured to and insulated from the lever 205. The contacts 219 and 220 have a wiping engagement and are normally disposed in the position indicated in Fig. 18. When, however, the lever 205 has been rotated on its pivot 204 by the movement of the pin setter through the gate 179 the contacts 219 and 220 will be separated and will remain separated until the lever 205 has been returned to its normal position by the member 216, the set of pins being simultaneously released from the distributer frame and deposited in the pin setter.

The contacts 219 and 220 are included in the electrical circuit in the manner illustrated diagrammatically in Fig. 16, in which 221 and 222 indicate the main lead wires from a source of current. 223 indicates a conductor leading from the positive lead wire 221 to the main clutch magnet 172, a blow-out coil 224 being included to prevent arcing at the contact points hereafter described. From the main clutch magnet 172 a conductor 225 is connected to branch conductors 226 and 227 leading, respectively, to the new set operation controlling magnet 170 and the deadwood-removal-operation controlling magnet 171. From the magnets 170 and 171 conductors 228 and 229 lead to a switch 230 having conductors 231 and 232 and an oscillating arm 233 provided with operating buttons 234. From the oscillating arm 233 a conductor 235 leads through a blow-out coil 236 to the contact 219 previously described. The contact 220 is connected to the negative lead wire 222 by the conductor 237. It will be readily appreciated that when the contacts 219 and 220 are separated in the manner described the circuit is broken and that if the operator presses either of the buttons 234 the mechanism will remain inoperative and he will be thereby notified that he must await the assembly of a set of pins and their delivery to the pin setter.

As soon as a set of pins has been delivered to the pin setter the conductors 219 and 220 will be automatically engaged and the operation of the machine may be continued at the will of the operator. The contacts 219 and 220 effectually prevent the movement of the pin setter to position adjacent the alley bed when empty which might result in dumping the pins from the distributer frame directly onto the alley bed.

The circuits and contact mechanism for controlling the electromagnets 147 whereby the standing pins are moved from the alley bed during the deadwood-removal operation and whereby any particular combination of pins may be selected from a set and lifted from the bed while the remaining pins are swept from the alley bed are identical with those disclosed in my aforesaid application and form no part of my present invention. Hence the contact mechanism and circuits are not specifically described in the present application.

The operation of the pin setting machine will be more clearly understood from the following brief description thereof: Twenty-nine pins are employed in the machine and we may assume that a set of pins is disposed in the pin setter and nine pins have been assembled on the assembly shelf while the remaining pins are disposed in the alley pit and elevating mechanism. The first operation is that of depositing a set of pins on the alley bed and is accomplished by actuating the button 234 controlling the magnet 170. Upon actuation of the button the first movement of the machine is that of the sweeper 238, which is identical in structure and mode of operation with that disclosed in my above-mentioned application and therefore need not be described in detail. The sweeper descends and passes along the alley bed to remove any pins or balls which may remain thereon. As the sweeper 238 returns the pin setter descends guided by the cam plates 168 and as the setter approaches the alley bed the semi-casings 150 and 151 are separated to release the pins. The pin setter then ascends passing through the gate 179 and setting the lever 205. The player rolls a ball along the alley bed, knocking down some of the pins which thus become deadwood. The next operation is that of removing the deadwood and is accomplished by actuating the button 234 controlling the magnet 171. Upon actuation of the button 234 the pin setter descends guided by the slots 172 in the cam plates 168 sufficiently to allow the electromagnets 147 to contact with the heads of the pins. The electromagnets 147 are simultaneously energized and the pin setter ascends carrying the standing pins upwardly away from the alley bed. The sweeper 238 descends and sweeps the deadwood and the ball if it remains on the alley bed into the pit where the pins and balls slide down the inclined floor 3 through the opening 4 in the pad 5. The balls are lifted from the floor and deposited in the path of the arms 50 on the conveyer chains 45 while the pins passing beneath the ball-lifting means are lifted and deposited in the casing 39 in the path of the upturned end 47 of the rod 46. The balls and pins are separately elevated, the balls being deposited in the ball return and the pins being delivered to the chute 54, whence they pass to the assembly shelf and are moved laterally by the screw conveyer 59 until ten pins have been assembled. As the tenth pin is received on the assembly shelf the cam member 114 on the Geneva wheel 111 actuates the rod 104, through the mechanism provided, to release the pins from the assembly shelf whence they pass to the distributer frame and are held by gates 135 until the pin 213 on the Geneva wheel 111 actuates the rod 211 to rotate the lever 206.

It will be recalled that the lever 205 has already been set by the upward movement of the pin setter and consequently upon the movement of the lever 206 the quadrant 182 is operatively connected to the constantly vibrating pin 184 and the shaft 142 is rocked to open the gates 135 and allow the pins to be deposited in the setter frame. Simultaneously the levers 205 and 206 are returned to their normal position incidentally connecting the contacts 219 and 220 and closing the operating circuit. Obviously the sequence of actuation of the levers 205 and 206 may be reversed, the lever 206 being first actuated following the delivery of pins to and from the assembly shelf to the distributer frame and the lever 205 being actuated by the upward movement of the pin setter after depositing a set of pins on the alley bed. The pins on the distributer frame will thereby be released and deposited in the pin setter. This cycle of operations is continuous and sufficiently rapid to allow very rapid playing while maintaining always an available set of pins in the pin setter.

It will be readily understood that various changes may be made in the devices, mechanism and circuits described without departing from the spirit or scope of the invention or sacrificing any of its material advantages, the form herein disclosed being merely the preferred embodiment of the invention.

I claim:

1. In a pin setting machine for a bowling alley, the combination of a stationary sloping floor in the alley pit and an element rotating in a plane normal to the axis of the alley to lift the pins from said floor.

2. In a pin setting machine for a bowling alley, the combination of a stationary sloping floor in the alley pit, means to lift the pins from said floor, and elevating means adapted to receive the pins from said lifting means.

3. In a pin setting machine for a bowling alley, the combination of a stationary sloping floor in the alley pit, a continuously rotating element to lift the pins from said floor, elevating means adapted to receive the pins from said rotating element, and means to insure delivery of the pins from said rotating element to said elevating means with their butt ends foremost.

4. In a pin setting machine for a bowling alley, the combination of a stationary sloping floor in the alley pit, a continuously rotating element to lift the pins from said floor, elevating means adapted to receive the pins from said rotating element, means to insure delivery of the pins from said rotating element to said elevating means with their butt ends foremost, and a cushion disposed forwardly of said rotating element and provided with an aperture adjacent said floor through which the pins may pass.

5. In a pin setting machine for a bowling alley, the combination of a floor in the alley pit, means to lift the pins from said floor, elevating means adapted to receive the pins from said lifting means, and means to insure delivery of the pins from said lifting to said elevating means with their butt ends foremost.

6. In a pin setting machine for a bowling alley, the combination of a continuously rotating element to lift the pins from the alley pit, elevating means adapted to receive the pins from said rotating element, and means to insure delivery of the pins from said rotating element to said elevating means with their butt ends foremost.

7. In a pin setting machine for a bowling alley, the combination of means to lift the pins from the alley pit, a conveyer adapted to receive the pins from said lifting means, and stationary means in the path of the pins on said lifting means and adapted to coöperate therewith to insure delivery of the pins from said lifting means to said conveyer with their butt ends foremost.

8. In a pin setting machine for a bowling alley, the combination of means to lift the pins from the alley pit, and stationary means in the path of the pins on said lifting means to insure delivery of the pins from said lifting means with their butt ends foremost.

9. In a pin setting machine for a bowling alley, the combination of a means to lift the pins from the alley pit including a rotatable element provided with recesses in its face and coöperating stationary elements, and a stationary member disposed in the path of the pins provided with a recess of sufficient width only to receive the heads of the pins, whereby when pins are lifted by said rotatable elements with their heads disposed in the direction of movement thereof, said heads will enter said recess and said pins will be caused to rotate, thus insuring delivery of the pins with their butt ends foremost.

10. In a pin setting machine for a bowling alley, the combination of a stationary sloping floor in the alley pit, an element rotating in a plane normal to the axis of the alley to lift the pins from said floor, and means to separate the balls from the pins before the pins engage said rotating element.

11. In a pin setting machine for a bowling alley, the combination of a stationary sloping floor in the alley pit, a continuously rotating element to lift the pins from said floor, means to separate the balls from the pins before the pins engage said rotating element, and elevating means adapted to receive the pins from said rotating element.

12. In a pin setting machine for a bowling alley, the combination of means rotatable in a plane normal to the axis of the alley to lift the pins from the alley pit, and means to separate the balls from the pins before the pins engage said rotatable means.

13. In a pin setting machine for a bowling alley, the combination of rotatable means to lift the pins from the alley pit, means to separate the balls from the pins before the pins engage said rotatable means, and conveyer means adapted to receive the pins from said rotatable means.

14. In a pin setting machine for a bowling alley, the combination of rotatable means to lift the pins from the alley pit, rotatable means to separate the balls from the pins before the pins engage said first-mentioned rotatable means, and means adapted to receive and independently elevate the balls and pins.

15. In a pin setting machine for a bowling alley, the combination of rotatable means to lift the pins from the alley pit, means to separate the balls from the pins before the pins engage said rotatable means, a conveyer adapted to receive and independently elevate the balls and pins, and means coöperating with said rotatable means to insure delivery of the pins therefrom with their butt ends foremost.

16. In a pin setting machine for a bowling alley, the combination of a stationary sloping floor, and an element rotating in a plane normal to the axis of the alley to lift the balls from said floor.

17. In a pin setting machine for a bowling alley, the combination of a floor, an element rotating in a plane normal to the axis of the alley to lift the balls from said floor, and conveyer means adapted to receive the balls from said rotating element.

18. In a pin setting machine for a bowling alley, the combination of a stationary sloping floor, and a continuously rotating element to lift the balls from said floor, said element being spaced from the floor sufficiently to allow the pins to pass therebeneath.

19. In a pin setting machine for a bowling alley, the combination of rotatable means in the alley pit for separating the pins and balls, and separate means to receive the pins and balls from said rotatable means.

20. In a pin setting machine for a bowling alley, the combination of rotatable means in the alley pit for separating the pins and balls, and means for independently elevating the separated pins and balls.

21. In a pin setting machine for a bowling alley, the combination of rotatable means in the alley pit for separating the pins and balls, a conveyer, and means on said conveyer for independently elevating the separated pins and balls.

22. In a pin setting machine for a bowling alley, the combination of a sloping floor in the alley pit, rotatable means above said floor to lift the balls therefrom, said means being spaced sufficiently from said floor to allow the pins to pass therebeneath, and rotatable means disposed rearwardly of said first-mentioned rotatable means to lift the pins from said floor.

23. In a pin setting machine for a bowling alley, the combination of a sloping floor in the alley pit, rotatable means above said floor to lift the balls therefrom, said means being spaced sufficiently from said floor to allow the pins to pass therebeneath, rotatable means disposed rearwardly of said first-mentioned rotatable means to lift the pins from said floor, and separate means to receive the pins and balls.

24. In a pin setting machine for a bowling alley, the combination of a sloping floor in the alley pit, rotatable means above said floor to lift the balls therefrom, said means being spaced sufficiently from said floor to allow the pins to pass therebeneath, rotatable means disposed rearwardly of said first-mentioned rotatable means to lift the pins from said floor, separate means to receive the pins and balls, and a cushion disposed forwardly of said rotatable means and provided with an aperture adjacent said floor through which the pins and balls may pass.

25. In a pin setting machine for a bowling alley, the combination of a sloping floor in the alley pit, rotatable means above said floor to lift the balls therefrom, said means being spaced sufficiently from said floor to allow the pins to pass therebeneath, rotatable means disposed rearwardly of said first-mentioned rotatable means to lift the pins from said floor, and means to independently elevate the separated pins and balls.

26. In a pin setting machine for a bowling alley, the combination of a sloping floor in the alley pit, rotatable means above said floor to lift the balls therefrom, said means being spaced sufficiently from said floor to allow the pins to pass therebeneath, rotatable means disposed rearwardly of said first-mentioned rotatable means to lift the pins from said floor, an elevator, and means carried by said elevator to coöperate with and elevate the separated pins and balls.

27. In a pin setting machine for a bowling alley, the combination of a sloping floor in the alley pit, rotatable means above said floor to lift the balls therefrom, said means being spaced sufficiently from said floor to allow the pins to pass therebeneath, rotatable means disposed rearwardly of said first-mentioned rotatable means to lift the pins from said floor, an elevator, means carried by said elevator to coöperate with and elevate the separated pins and balls, and a cushion disposed forwardly of said rotatable means and provided with an aperture adjacent said floor through which the pins and balls may pass.

28. In a pin setting machine for a bowling alley, means for elevating the pins, including an endless carrier and means mounted thereon adapted to engage an opening in the base of each pin.

29. In a pin setting machine for a bowling alley, means for elevating the pins, including an endless carrier and means mounted thereon and extending laterally therefrom adapted to engage an opening in the base of each pin.

30. In a pin setting machine for a bowling alley, means for elevating the pins, including an endless carrier and a rod mounted thereon and provided with an upturned end adapted to engage an opening in the base of each pin.

31. In a pin setting machine for a bowling alley, means for elevating the pins, including an endless carrier, a rod mounted thereon and provided with an upturned end adapted to engage an opening in the base of each pin, and means for retaining said upturned end in its normal pin-engaging position.

32. In a pin setting machine for a bowling alley, means for elevating the pins, including an endless carrier, a rod mounted thereon and provided with an upturned end adapted to engage an opening in the base of each pin, and a spiral spring surrounding said rod and secured to said carrier and rod to resiliently retain said upturned end in normal pin-engaging position.

33. In a pin setting machine for a bowling alley, means for elevating the pins including an endless carrier, means secured thereto and adapted to engage an opening in the base of each pin, and means disposed in the path of said first-mentioned means to receive and center the pins.

34. In a pin setting machine for a bowling alley, means for elevating the pins including an endless carrier, means secured thereto and adapted to engage the opening in the base of each pin, means disposed in the path of said first-mentioned means to receive and center the pins, and means to deliver pins singly to the pin-centering means.

35. In a pin setting machine for a bowling alley, means for elevating the pins including an endless carrier, means secured thereto and adapted to engage an opening in the base of each pin, a casing disposed in the path of said means to receive and center the pins, means to deliver pins singly to said casing, and means coöperating with said last-mentioned means to insure delivery of the pins with their butt ends foremost.

36. In a pin setting machine for a bowling alley, means for elevating the pins including means for separating the pins from the balls, an endless carrier, means secured thereto and adapted to engage an opening in the base of each pin, means disposed in the path of said first-mentioned means to receive and center the pins, and means to deliver pins singly to said pin-centering means.

37. In a pin setting machine for a bowling alley, means for elevating the pins and balls including an endless carrier, separate means supported thereon to receive the pins and balls, and means for separating and delivering the pins and balls thereto.

38. In a pin setting machine for a bowling alley, means for elevating the pins and balls including an endless carrier, separate means supported thereon to receive the pins and balls, and rotatable means for separating and delivering the pins and balls thereto.

39. In a pin setting machine for a bowling alley, means for elevating the pins and balls including an endless carrier, separate means supported thereon to receive the pins and balls, rotatable means to lift the balls from the alley pit and deliver them to the ball-receiving means on said carrier, and rotatable means disposed rearwardly of said first-mentioned rotatable means to lift the pins from the alley pit and deliver them to the pin-receiving means on said carrier.

40. In a pin setting machine for a bowling alley, means for elevating the pins and balls including an endless carrier, means supported on said carrier adapted to engage an opening in the base of each of the pins, separate means supported on said carrier to receive the balls, rotatable means to lift the pins from the alley pit and deliver them singly to the pin-receiving means on said carrier, and rotatable means to lift the balls from the alley pit and deliver them singly to the ball-receiving means on said carrier.

41. In a pin setting machine for a bowling alley, the combination of an assembly shelf, means for elevating the pins and delivering them to said assembly shelf, a member disposed in the path of the pins on said elevating means, and means controlled by said member to advance the pins along said shelf.

42. In a pin setting machine for a bowling alley, the combination of an assembly shelf, means for elevating the pins and delivering them to said assembly shelf, a member disposed in the path of the pins on said elevating means, means controlled by said member to advance the pins along said shelf, and means for releasing the pins from said assembly shelf when a set of pins has been assembled.

43. In a pin setting machine for a bowling alley, the combination of an assembly shelf, means for elevating the pins and delivering them to said assembly shelf, a member disposed in the path of the pins on said elevating means, a shaft provided with a screw conveyer disposed above said shelf, and means controlled by said member to rotate said shaft.

44. In a pin setting machine for a bowling alley, the combination of an assembly shelf, means for elevating the pins and delivering them to said assembly shelf, a member disposed in the path of the pins on said elevating means, a shaft provided with a screw conveyer disposed above said shelf, means controlled by said member to rotate said shaft, and means for automatically releasing the pins from said assembly shelf when a set of pins has been assembled.

45. In a pin setting machine for a bowling alley, the combination of an assembly shelf, means for elevating the pins, a chute adapted to receive the pins from said elevating means and deliver them to said assembly shelf, a member resiliently mounted in the path of the pins at the upper end of said chute, a shaft provided with a screw conveyer disposed above said assembly shelf, and means controlled by said member to cause said shaft to make a single revolution whenever a pin is delivered to said chute.

46. In a pin setting machine for a bowling alley, the combination of an assembly shelf, means for elevating the pins, a chute adapted to receive the pins from said elevating means and deliver them to said assembly shelf, a member resiliently mounted in the path of the pins at the upper end of said chute, a shaft provided with a screw conveyer disposed above said assembly shelf, means controlled by said member to cause said shaft to make a single revolution whenever a pin is delivered to said chute, and means for automatically releasing the pins from said assembly shelf when a set of pins has been assembled.

47. In a pin setting machine for a bowling alley, the combination of an assembly shelf, means to deliver pins to said assembly shelf, conveying means disposed to move the pins along said shelf, a continuously driven member, and means for intermittently establishing a frictional driving connection between said member and conveying means.

48. In a pin setting machine for a bowling alley, the combination of an assembly shelf, means to deliver pins to said assembly shelf, conveying means disposed to move the pins along said assembly shelf, a continuously driven member, means for intermittently establishing a frictional driving connection between said member and conveying means, and means for breaking said connection after a predetermined degree of movement.

49. In a pin setting machine for a bowling alley, the combination of an assembly shelf, means to deliver pins to said assembly shelf, rotatable conveying means disposed to move the pins along said assembly shelf, a continuously driven member, means for intermittently establishing a frictional driving connection between said member and rotatable conveying means, and means for breaking said connection and preventing further movement of said rotatable conveying means after each revolution thereof.

50. In a pin setting machine for a bowling alley, the combination of an assembly shelf, means to deliver pins to said assembly shelf, rotatable conveying means disposed to move the pins along said assembly shelf, a continuously driven member, a member disposed in the path of the pins on said first-mentioned means and adapted to be actuated thereby, and means controlled by said member to establish a frictional driving connection between said continuously driven member and rotatable conveying means.

51. In a pin setting machine for a bowling alley, the combination of an assembly shelf, means to deliver pins to said assembly shelf, rotatable conveying means disposed to move the pins along said assembly shelf, a continuously driven member, a member disposed in the path of the pins on said first-mentioned means and adapted to be actuated thereby, means controlled by said member to establish a frictional driving connection between said continuously driven member and rotatable conveying means, and means for breaking said connection and preventing further movement of said rotatable conveying means after each revolution thereof.

52. In a pin setting machine for a bowling alley, the combination of an assembly shelf, means to deliver pins to said assembly shelf, a shaft provided with a screw conveyer disposed above said shelf, a brake drum secured to said shaft, a continuously driven brake drum, a brake band secured to said first-mentioned brake drum and adapted to engage said continuously driven brake drum, means for normally preventing such engagement, and means actuated whenever a pin is delivered to said assembly shelf to render said preventive means inoperative whereby said shaft is caused to rotate.

53. In a pin setting machine for a bowling alley, the combination of an assembly shelf, means to deliver pins to said assembly shelf, a shaft provided with a screw conveyer disposed above said shelf, a brake drum secured to said shaft, a continuously driven brake drum, a brake band secured to said first-mentioned brake drum and adapted to engage said continuously driven brake drum, means for normally preventing such engagement, means actuated whenever a pin is delivered to said assembly shelf to render said preventive means inoperative whereby said shaft is caused to rotate, and means to automatically release the pins from said assembly shelf when a set of pins has been assembled.

54. In a pin setting machine for a bowling alley, the combination of an assembly shelf, means for delivering pins to said assembly shelf, means for moving the pins as received along said assembly shelf, means to normally retain said assembly shelf in pin-receiving position including a rod extending longitudinally thereof and fixed members adapted to be engaged by the ends of said rod, and means for actuating said rod to release said assembly shelf.

55. In a pin setting machine for a bowling alley, the combination of an assembly shelf, means for delivering pins to said assembly shelf, means for moving the pins as received along said assembly shelf, means to normally retain said assembly shelf in pin-receiving position including a rod extending longitudinally thereof and fixed members adapted to be engaged by the ends of said rod, and means for actuating said rod to release said assembly shelf including rotatable means actuated to complete a revolution when ten pins have been assembled and an operative connection between said rod and rotatable means.

56. In a pin setting machine for a bowling alley, the combination of an assembly shelf, means for delivering pins to said assembly shelf, a shaft provided with a screw conveyer disposed above said assembly shelf, means controlled by the delivery of pins to said assembly shelf for intermittently rotating said shaft, means to normally retain said assembly shelf in pin-receiving position including a rod extending longitudinally thereof and fixed members adapted to be engaged by the ends of said rod, and means for actuating said rod to release said assembly shelf including a member adapted to be partially rotated at each complete revolution of said shaft, and means actuated when said member has completed a revolution and operatively connected to said rod.

57. In a pin setting machine for a bowling alley, the combination of an assembly shelf, means for delivering pins to said assembly shelf, a shaft provided with a screw conveyer disposed above said assembly shelf, means controlled by the delivery of pins to said assembly shelf for intermittently rotating said shaft, means to normally retain said assembly shelf in pin-receiving position, and means for releasing said assembly shelf including a circular member rotatable with said shaft and provided with a pin, a member provided with a plurality of slots in its periphery adapted to be engaged by said pin, a cam nose on said last-mentioned member, and means in the path of said cam nose and operatively connected to said retaining means.

58. In a pin setting machine for a bowling alley, the combination of an assembly shelf, means for elevating the pins and delivering them to said assembly shelf, a shaft provided with a screw conveyer disposed above said assembly shelf, a member disposed in the path of the pins on said elevating means, means controlled by said member to cause said shaft to make a single revolution as each pin is delivered to said assembly shelf, means to normally retain said assembly shelf in pin-receiving position, and means for releasing said assembly shelf including a circular member rotatable with said shaft and provided with a pin, a member provided with a plurality of slots in its periphery adapted to be engaged by said pin, a cam nose on said last-mentioned member, and means in the path of said cam nose and operatively connected to said retaining means.

59. In a pin setting machine for a bowling alley, the combination of means adjacent the alley pit for separating the pins from the balls, means for elevating the pins, an assembly shelf adapted to receive the pins from said elevating means, a member disposed in the path of the pins on said elevating means, means controlled by said member to advance the pins along said assembly shelf, means for releasing the pins from said assembly shelf when a full set of pins has been assembled, and a distributer frame adapted to receive the pins from said assembly shelf.

60. In a pin setting machine for a bowling alley, the combination of means adjacent the alley pit for separating the pins from the balls, means for elevating the pins, an assembly shelf adapted to receive the pins from said elevating means, a member disposed in the path of the pins on said elevating means, means controlled by said member to advance the pins along said assembly shelf, means for releasing the pins from said assembly shelf when a full set of pins has been assembled, a distributer frame adapted to receive the pins from said assembly shelf, a pin setter beneath said distributer frame, and means for releasing the pins from said distributer frame and delivering them to said pin setter.

61. In a pin setting machine for a bowling alley, the combination of means to lift the balls from the alley pit, a ball return track, and means for spinning the balls as they are delivered from said lifting means in the direction of their rotation while rolling along said ball return track.

62. In a pin setting machine for a bowling alley, the combination of means to lift the balls from the alley pit, a ball return track, a curved guide in the path of the balls on said lifting means to direct the balls onto said ball-return track, and resilient means which, coöperating with said curved guide, cause the balls to spin in the direction of their rotation while rolling along said ball return track.

63. In a pin setting machine for a bowling alley, the combination of means to lift the balls from the alley pit, a ball return track, a curved guide in the path of the balls on said lifting means to direct the balls onto said ball return track, and pivoted rails resiliently biased in an upward direction, which, coöperating with said curved guide, causes the balls to spin in the direction of their rotation while rolling along said ball return track.

64. In a pin setting machine for a bowling alley, the combination of rotatable means in the alley pit to lift the balls therefrom, a conveyer to elevate the balls, a ball return track adapted to receive the balls from said conveyer, a rigid curved guide in the path of the balls on said conveyer to direct the balls onto said ball return track, pivoted rails adapted to receive and deliver the ball to said ball return track, and springs biasing said pivoted rails in the direction of said curved guide, whereby the balls are spun as they are delivered from said conveyer in the direction of their rotation while rolling along said ball return track.

65. In a pin setting machine for a bowling alley, the combination of a distributer frame, means for delivering pins thereto, a plurality of pivotally mounted gates to retain the pins in said distributer frame, and means for simultaneously actuating said gates to release the pins.

66. In a pin setting machine for a bowling alley, the combination of a distributer frame, means for delivering pins thereto, a pin setter, a plurality of pivotally mounted gates to retain the pins in said distributer frame, and means for simultaneously actuating said gates to release and deliver the pins to said pin setter.

67. In a pin setting machine for a bowling alley, the combination of a distributer frame, means for assembling a set of pins and delivering them to said distributer frame, a pin setter, a plurality of pivotally mounted gates to retain the pins in said distributer frame, and means for simultaneously actuating said gates to release and deliver the pins to said pin setter.

68. In a pin setting machine for a bowling alley, the combination of a distributer frame, means for delivering pins thereto, means for retaining the pins therein, and means for actuating said retaining means to release the pins, including a constantly vibrating member, and means operatively connected to said retaining means and adapted to be intermittently actuated by said member.

69. In a pin setting machine for a bowling alley, the combination of a distributer frame, means for delivering pins thereto, a plurality of pivotally mounted gates to retain the pins therein, a rock shaft provided with an arm, means operatively connecting said gates to said arm, and means for rocking said shaft including a constantly vibrating member, a crank secured to said shaft, and means for intermittently connecting said crank and vibrating member.

70. In a pin setting machine for a bowling alley, the combination of a distributer frame, means for assembling and delivering a set of pins to said distributer frame, a pin setter adapted to receive pins from said distributer frame, and a single means for controlling the delivery of pins from said assembling means and distributer frame.

71. In a pin setting machine for a bowling alley, the combination of a distributer frame, means for assembling and delivering a set of pins to said distributer frame, a pin setter adapted to receive pins from said distributer frame, a single means for controlling the delivery of pins from said assembling means and distributer frame, and auxiliary means actuated by the pin setter for controlling the delivery of pins from said distributer frame.

72. In a pin setting machine for a bowling alley, the combination of a distributer frame, means for assembling and delivering sets of pins to said distributer frame, a pin setter adapted to receive pins from said distributer frame, means actuated by said pin setter for controlling the delivery of pins thereto, and auxiliary means actuated when a full set of pins has been assembled and delivered to said distributer frame for controlling the delivery of pins to said pin setter.

73. In a pin setting machine for a bowling alley, the combination of a distributer frame, means for assembling and delivering sets of pins to said distributer frame, a pin setter adapted to receive pins from said distributer frame, means to normally retain the pins on said distributer frame, and means for actuating said retaining means to release the pins including a rock shaft, operatively connected to said retaining means, a quadrant secured to said shaft, a slot in said quadrant, a constantly vibrated member in said slot, a latch on said quadrant adapted to lock said member thereto, and means for intermittently releasing said latch.

74. In a pin setting machine for a bowling alley, the combination of a distributer frame, means for assembling and delivering sets of pins to said distributer frame, a pin setter adapted to receive the pins from said distributer frame, means to normally retain the pins on said distributer frame, and means for actuating said retaining means to release the pins including a rock shaft operatively connected to said retaining means, a quadrant secured to said shaft, a slot in said quadrant, a constantly vibrated member in said slot, a latch on said quadrant adapted to lock said member thereto, a pair of rods normally disposed in the path of said latch and independent means for separately withdrawing said rods from the path of said latch.

75. In a pin setting machine for a bowling alley, the combination of a distributer frame, means for assembling and delivering sets of pins to said distributer frame, a pin setter adapted to receive the pins from said distributer frame, means to normally retain the pins on said distributer frame, and means for actuating said retaining means to release the pins including a rock shaft operatively connected to said retaining means, a quadrant secured to said shaft, a slot in said quadrant, a constantly vibrated member in said slot, a latch on said quadrant adapted to lock said member thereto, a pair of rods normally disposed in the path of said latch and independent means for separately withdrawing said rods from the path of said latch, said means including pivoted levers operatively connected to said rods, means for actuating one of said levers when a set of pins has been assembled and delivered to said distributer frame and means for actuating the other of said levers when the pin setter is returned to its normal position after depositing a set of pins on the alley bed.

ERNEST HEDENSKOOG.

Witnesses:
F. J. LOEWE,
D. VALK, Jr.